US010152378B2

(12) United States Patent
Zhu et al.

(10) Patent No.: US 10,152,378 B2
(45) Date of Patent: Dec. 11, 2018

(54) DATA PROTECTION FOR A COLD STORAGE SYSTEM

(71) Applicant: Futurewei Technologies, Inc., Plano, TX (US)

(72) Inventors: Xiaogang Zhu, Santa Clara, CA (US); Masood Mortazavi, Santa Clara, CA (US)

(73) Assignee: FutureWei Technologies, Inc., Plano, TX (US)

( * ) Notice: Subject to any disclaimer, the term of this patent is extended or adjusted under 35 U.S.C. 154(b) by 52 days.

(21) Appl. No.: 15/285,128

(22) Filed: Oct. 4, 2016

(65) Prior Publication Data

US 2018/0095828 A1 Apr. 5, 2018

(51) Int. Cl.
*G06F 11/10* (2006.01)
*G06F 3/06* (2006.01)

(52) U.S. Cl.
CPC .......... *G06F 11/1096* (2013.01); *G06F 3/064* (2013.01); *G06F 3/0619* (2013.01); *G06F 3/0689* (2013.01)

(58) Field of Classification Search
CPC .. G06F 11/1008; G06F 11/1076; G06F 12/02; G06F 12/16; G06F 2211/1057; G06F 11/1096; G06F 3/0619; G06F 3/064; G06F 3/0689; G11C 29/52; G11C 29/765
See application file for complete search history.

(56) References Cited

U.S. PATENT DOCUMENTS

| 6,675,318 B1* | 1/2004 | Lee .................... G06F 11/1076 714/6.21 |
| 9,153,347 B2* | 10/2015 | Xu ........................ G06F 11/1012 |
| 2013/0124776 A1* | 5/2013 | Hallak ................ G06F 11/1092 711/102 |
| 2014/0089580 A1 | 3/2014 | Yochai et al. |
| 2017/0192858 A1* | 7/2017 | Zhang ................... G06F 11/167 |

FOREIGN PATENT DOCUMENTS

| CN | 101976174 A | 2/2011 |
| CN | 102081559 A | 6/2011 |
| WO | 2014111979 A1 | 7/2014 |

* cited by examiner

*Primary Examiner* — Shelly A Chase
(74) *Attorney, Agent, or Firm* — FutureWei Technologies, Inc.

(57) ABSTRACT

A cold storage system includes data storage devices and parity storage devices. The data storage devices and the parity storage devices form a multiple dimensional matrix which has multiple rows and multiple columns. A controller receives a data write request, selects a data storage device for storing a plurality of data blocks, and writes the data blocks sequentially into memory blocks of the selected data storage device, each data block belonging to a row stripe distributed over one row of the matrix and to a column stripe distributed over one column of the matrix. The controller also generates a row protection block for the row stripe and a column protection block for the column stripe, and writes the row protection block and the column protection block to parity storage devices in the system.

15 Claims, 11 Drawing Sheets

DATA PROTECTION FOR A COLD STORAGE SYSTEM

BACKGROUND

Cold storage is a storage paradigm for storing large amounts of data that are rarely access or modified. For example, cold storage data may be employed to store sensor output, camera footage, internet of things (IoT) related data, archived electronic messages, or other archive data. Cold storage operates on the presumption that large amounts of data that are to be stored and most of the data will be modified rarely or not at all. Cold storage systems are designed to provide large amounts of storage in a space and energy efficient manner. Data access time for cold storage systems should be reasonable while maintaining high data density and minimizing power consumption. Multiple accesses may also be beneficial for searching the large data volumes. The cold storage system should also be protected from hardware failure and provide efficient mechanisms for hardware replacement and data recovery when hardware components fail.

SUMMARY

This specification describes a data storage apparatus/method/system on cold storage systems to increase the data protection level with less or the same number of additional storage devices.

Certain aspects of the subject matter described here can be implemented as a method performed by a controller in a cold storage system. The system includes data storage devices configured to store data blocks and parity storage devices configured to store protection blocks, wherein the data storage devices and the parity storage devices form a 2 dimensional (2D) matrix having multiple rows and multiple columns, each row and each column having a plurality of data storage devices and at least one parity storage device. The controller receives a data write request to write a plurality of data blocks to the system, and selects a data storage device for storing the plurality of data blocks. The controller writes the data blocks sequentially into memory blocks of the selected data storage device without activating any of other data storage devices, each data block belonging to a row stripe distributed over one row of the matrix and to a column stripe distributed over one column of the matrix. Then the controller generates a row protection block for the row stripe and a column protection block for the column stripe for the said each data block, and writes the row protection block to a parity storage device in the row, and the column protection block to a parity storage device in the column.

Certain aspects of the subject matter described here can be implemented as a controller configured to perform operations described here. The controller is applied in a cold storage system. The system includes data storage devices configured to store data blocks and parity storage devices configured to store protection blocks, wherein the data storage devices and the parity storage devices form a 2 dimensional (2D) matrix having multiple rows and multiple columns, each row and each column having a plurality of data storage devices and at least one parity storage device. The controller includes a processor, a memory coupled to the processor and storing programming for execution by the processor. The processor is configured to execute the programming to perform operations of: receiving a data write request to write a plurality of data blocks to the system; selecting a data storage device for storing the plurality of data blocks; writing the data blocks sequentially into memory blocks of the selected data storage device without activating any of other data storage devices, each data block belonging to a row stripe distributed over one row of the matrix and to a column stripe distributed over one column of the matrix; generating a row protection block for the row stripe and a column protection block for the column stripe for the said each data block; and writing the row protection block to a parity storage device in the row, and the column protection block to a parity storage device in the column.

Certain aspects of the subject matter described here can be implemented as a system including a controller, data storage devices configured to store data blocks, and parity storage devices configured to store protection blocks. The data storage devices and the parity storage devices form a 2 dimensional (2D) matrix having multiple rows and multiple columns, each row and each column having a plurality of data storage devices and at least one parity storage device. The controller configured to receive a data write request to write a plurality of data blocks to the system, select a data storage device for storing the plurality of data blocks, write the data blocks sequentially into memory blocks of the selected data storage device without activating any of other data storage devices, each data block belonging to a row stripe distributed over one row of the matrix and to a column stripe distributed over one column of the matrix, generate a row protection block for the row stripe and a column protection block for the column stripe for the said each data block, and write the row protection block to a parity storage device in the row, and the column protection block to a parity storage device in the column.

Certain aspects of the subject matter described here can be implemented as a computer-readable medium storing instructions executable by one or more processors to perform operations described here.

As such, the cold storage scheme protects storage devices from failure with more reliable and higher protection ratio at lower costs, reduces power consumption and component wear.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
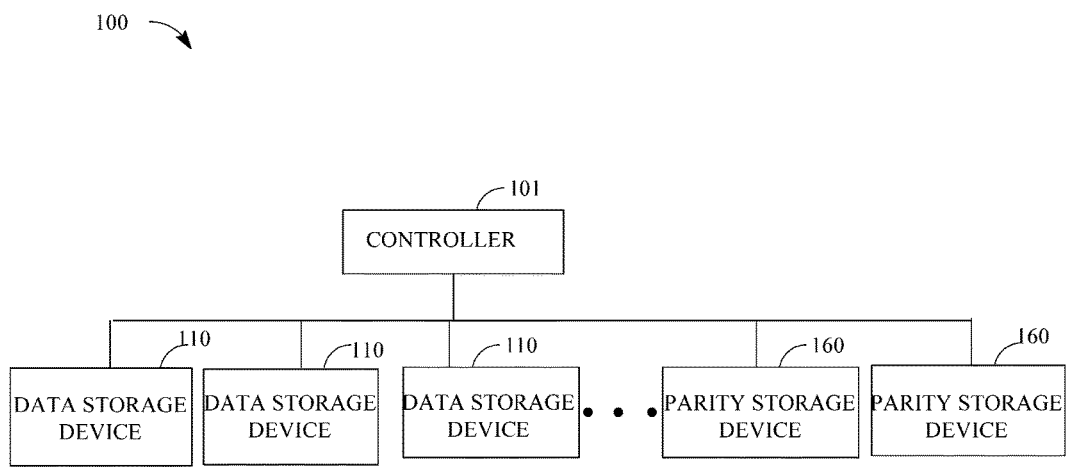
FIG. 1 is a schematic diagram of an embodiment of a cold storage system.

It should be understood at the outset that, although an illustrative implementation of one or more embodiments are provided below, the disclosed systems and/or methods may be implemented using any number of techniques, whether currently known or in existence.

Redundant Array of Independent Disk or Redundant Array of Independent Drive (RAID) is a data storage virtualization technology that combines multiple physical drive components into a single local unit for the purpose of redundancy, performance improvement, or both. RAID systems employing striping allow for high speed read and write (e.g. fast updates), space efficient storage, and data recovery. However, RAID systems employing striping may not be efficient for cold storage systems. For cold storage systems, fast access time may be less important than increasing data reliability, reducing power consumption and component wear. For example, any data access to a stripe (e.g. read or write) may require all storage devices to be activated, which increases wear (e.g. deterioration) on the devices and power consumption. Moreover, RAID systems employing RAID 1, RAID 5, RAID 6, and Reed-Solomon to protect data from device failures, may not be efficient for cold storage systems. Protection ratio (PR) is specific to the number of failed devices in the protection array. It is the ratio of the number of recoverable failure cases to the total number of possible failure cases for a specified number of devices failed simultaneously within a protection domain. For RAID 5, if one device fails, PR is 100% recoverable. If two or more device fails, PR is 0% recoverable since RAID 5 cannot recover two or more failed devices within the protection array. For RAID 6, if one or two devices fail, PR is 100% recoverable. If three or more devices fail, PR is 0% recoverable. Similarly, for Reed-Solomon Codes, if 1 to R device fails, PR is 100% recoverable. If R+1 or more device failures, PR is 0% recoverable. The cost for the redundancy is increased when higher protection level is required.

This disclosure provides a data storage apparatus/method/system on cold storage systems for the purpose of increasing protection ratio with less parity storage devices, so as to reduce the system cost and power consumption, and improve the reliability of the stored data. Aspects of this disclosure are related to descriptions in co-assigned U.S. patent application: application Ser. No. 15/007,953, Filed on Jan. 27, 2016, which is incorporated by reference herein as if reproduced in its entirety. The cold data storage scheme employs a plurality of Storage devices. Storage devices include data storage devices and parity storage devices. Correspondingly, a cold storage system includes a plurality of data storage devices and a plurality of parity storage devices. In order to improve protection ratio, storage devices could be logically configured to one or more multiple dimensional matrixes, such as 2D matrix, 3D matrix, or 4D matrix, etc. Data blocks are written in sequential memory blocks (also as storage blocks) on a device by device basis so that less/fewer storage devices are activated during read and/or write operations which saves power consumption and wear on the remaining devices in the matrix. For example, a single device needs to be activated while reading a file. For a cold storage system, most of data access operations are data reading operation. When writing a data block as described at FIG. 6, only N+1 devices, such as one data storage device and N parity storage devices, need to be activated for data writing purpose on a system configured in N dimensional matrix for protection purpose. For example, N equals to 2 for a 2D matrix. All protection blocks are written to the parity storage devices. Accordingly, protection blocks are confined to the parity storage devices, instead of being distributed across the all storage devices of the redundant storage array. Protection blocks are updated to the parity storage devices as part of process when writing each data block to a data storage device. As such, the cold storage scheme protects storage devices from failure with more reliable and higher protection ratio at lower costs, reduces power consumption and component wear, provides flexibility and simplicity for expansion of a cold storage system, and maintains a reasonable access time (e.g. single access read/write) for data access requests under a cold storage system environment.

FIG. 1 is a schematic diagram of an embodiment of a redundant storage array based a cold storage system 100. The cold storage system 100 includes a controller 101, a plurality of data storage devices 110, and a plurality of parity storage devices 160. The storage devices 110 and 160 may be hard disk drives (HDDs), solid state drives (SSDs), flash memory, compact discs (CDs), digital video discs (DVDs), BLU-RAY discs, or any other type of memory suitable for long term storage. Storage devices 110 and 160 are address based memory locations that can be written to, read from, searched, indexed, updated, and otherwise employed for memory storage purposes. It is recommended to use rewritable media for the parity storage devices. If non-rewritable media, such as CDs, DVDs, or Blu-ray discs, is used for parity storage devices, protection blocks of the parity storage devices should not be generated until data written to all data storage devices is completed. The data storage devices 110 and parity storage devices 160 may be a group of physical discs or a plurality of virtualized cloud drives. In a cold storage system, the data blocks stored in data storage devices are rarely modified or deleted. Therefore, the data writing to each data storage device 110 or parity storage device 160 is limited.

The controller 101 may be any device configured to receive data for storing the data to the system, prepare the received data into data blocks, and write the data blocks to the memory blocks on a selected data storage device 110. For example, the controller 101 may be a number of virtual machines (VMs) in a data center network or other network, a number of general purpose processors or an application specific integrated circuit (ASIC) on a hardware node (e.g. server) in a data center or other network, a number of general purpose processors or ASICs in a personal computer, etc.

Figure 2:
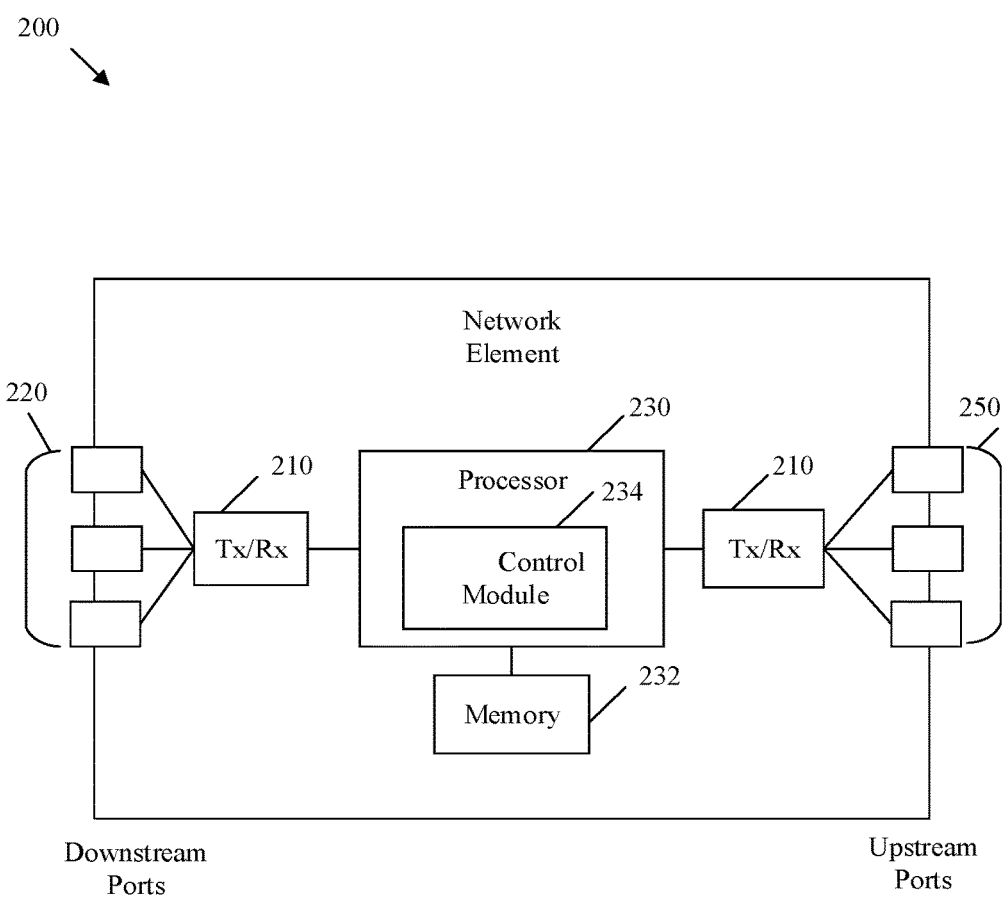
FIG. 2 is a schematic diagram of an embodiment of a network element (NE) configured to perform cold data storage functionality.

FIG. 2 is a schematic diagram of an embodiment of a network element (NE) 200 acting as a node in a system, such as a controller 101 in system 100. In some embodiments, NE 200 may control a set of storage device matrixes. The functionality of NE 200 may be implemented in a single node or a plurality of nodes in a system. The term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 200. For instance, the features/methods in the disclosure may be implemented using hardware, firmware, and/or software installed to run on hardware. The NE 200 may be any device that processes, reads, updates, stores, and/or forwards data frames/flows through a network, e.g. a server, a client, a network controller, etc. As shown in FIG. 2, the NE 200 may comprise transceivers (Tx/Rx) 210, which may be transmitters, receivers, or combinations thereof. Tx/Rxs 210 may be coupled to a plurality of ports 220 and 250 (e.g. upstream interfaces and/or downstream interfaces) for transmitting and/or receiving frames from other nodes. A processor 230 may be coupled to the Tx/Rxs 210 to process the frames and/or determine which nodes to send frames to. The processor 230 may include one or more multi-core processors and/or memory devices 232, which may function as data stores, buffers, etc. As such, NE 200 may store data in internal memory devices 232 or forward such data to external storage devices, depending on the embodiment. Processor 230 may be implemented as a general processor or may be part of one or more ASICs and/or digital signal processors (DSPs). Processor 230 may comprise a control module 234, which may perform methods 500, 600, 700, and/or 800, depending on the embodiment. In an alternative embodiment, the control module 234 may be implemented as instructions stored in memory 232, which may be executed by processor 230, for example as a computer program product stored in a non-transitory medium. In another alternative embodiment, the control module 234 may be implemented on separate NEs. The ports 220 and 250 may contain electrical and/or optical transmitting and/or receiving components. For example, the control module 234 may control a plurality of external devices (e.g. cloud drives), such as data storage device 110 and/or parity storage device 160 via transmissions through Tx/Rxs 210 and/or ports 220 and 250.

It is understood that by programming and/or loading executable instructions onto the NE 200, at least one of the processor 230, the control module 234, port 220 and 250, Tx/Rx 210, and/or memory 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
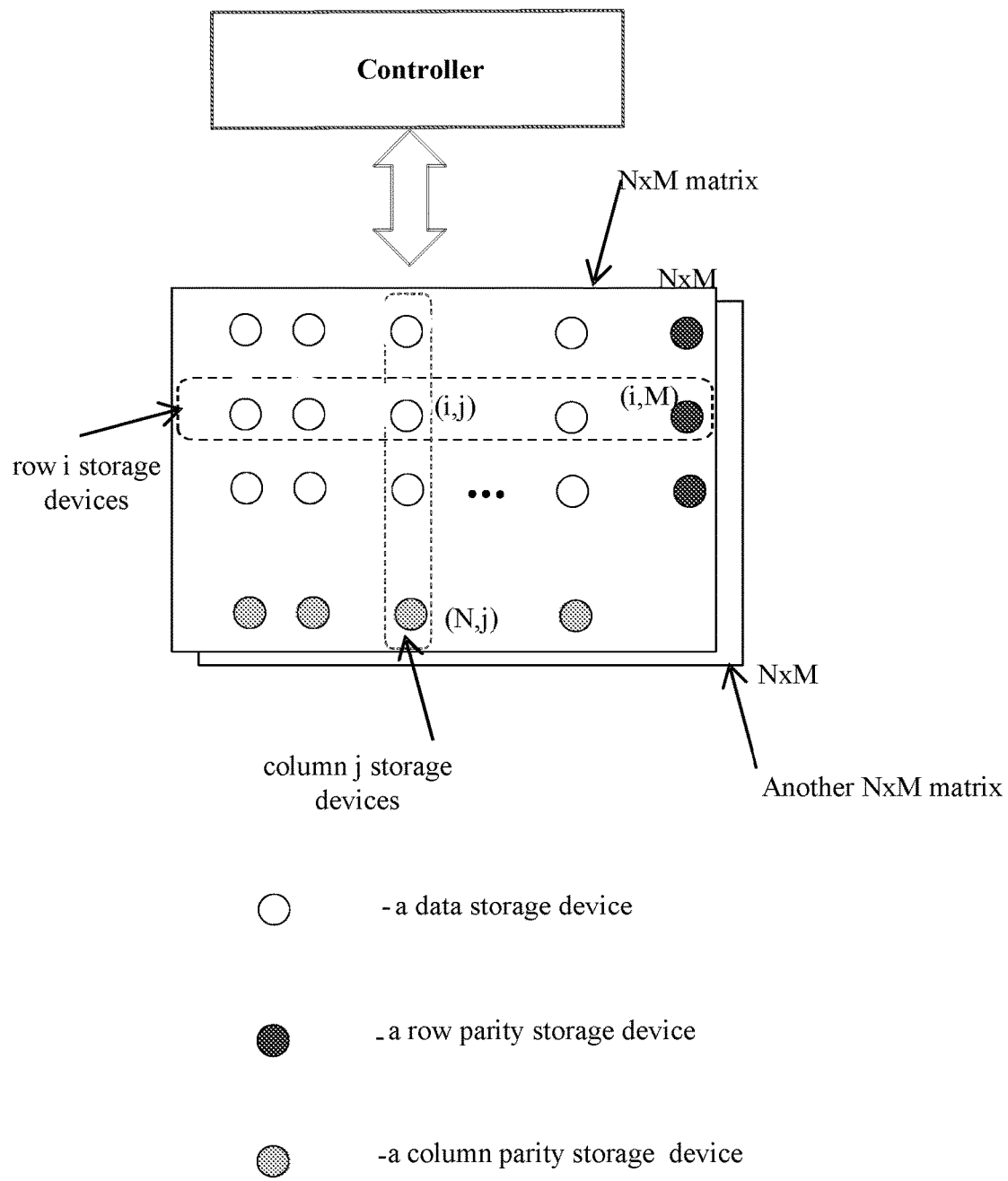
FIG. 3 is a schematic diagram of an embodiment of 2D matrix formed by storage devices.

In order to maximize data protection coverage, storage devices in system 100 are logically configured to one or more multiple dimensional matrixes, such as at least a 2D matrix, or at least a 3D matrix, or at least a 4D matrix, etc. Multiple 2D matrixes are illustrated in FIG. 3. Each 2D matrix includes N×M or N×M−1 storage devices. Each 2D matrix including N×M−1 storage devices is described by FIG. 3 as an example. When N is equal to M, the matrix is a square matrix. When N is not equal to M, the matrix is a rectangle matrix. Comparing to rectangle matrixes, square matrixes could maximize the data protection coverage and minimize the costs on the parity storage devices. In FIG. 3, each circle represents a storage device. A non-filled circle represents a data storage device to storage data. A circle with light shade represents a column parity storage device to store parity checksums for a specific column of data storage devices. Similarly, a circle with heavy shade represents a row parity storage device to store parity checksums for a specific row of data storage devices. For example. The data storage device $D_{ij}$ is located at (i, j) of an N×M matrix. Storage device $P_{iM}$ located at (i, M) of the matrix is a row parity storage device for the data storage devices in row i. Storage device $P_{Nj}$ located at (N, j) of the matrix is a column parity storage device for the data storage devices in column j. Each row includes a row parity storage device described here as an example. Each row may include more (such as two, three, etc.) row parity storage devices when higher protection level is required. Similarly, each column includes a column parity storage device described here as an example. Each column may include more (such as two, three, etc.) column parity storage devices to provide higher data protection level.

Take another example for 3D matrix. Assuming the storage devices are configured as an M1×M2×M3 matrix, a storage device $D_{xyz}$ is located at (x,y,z) in the matrix.

Figure 4A:
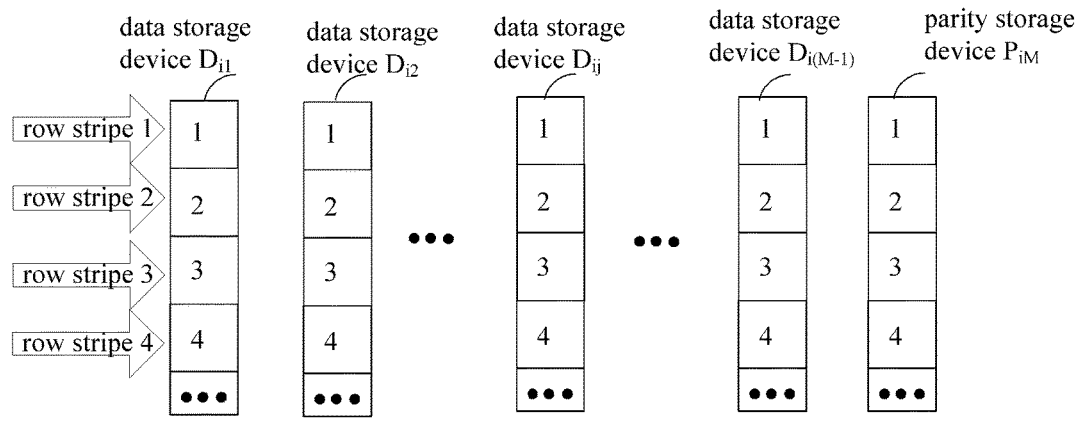
FIG. 4A is a schematic diagram of an embodiment for row stripes of a data device $D_{ij}$ within a 2D matrix.
Figure 4B:
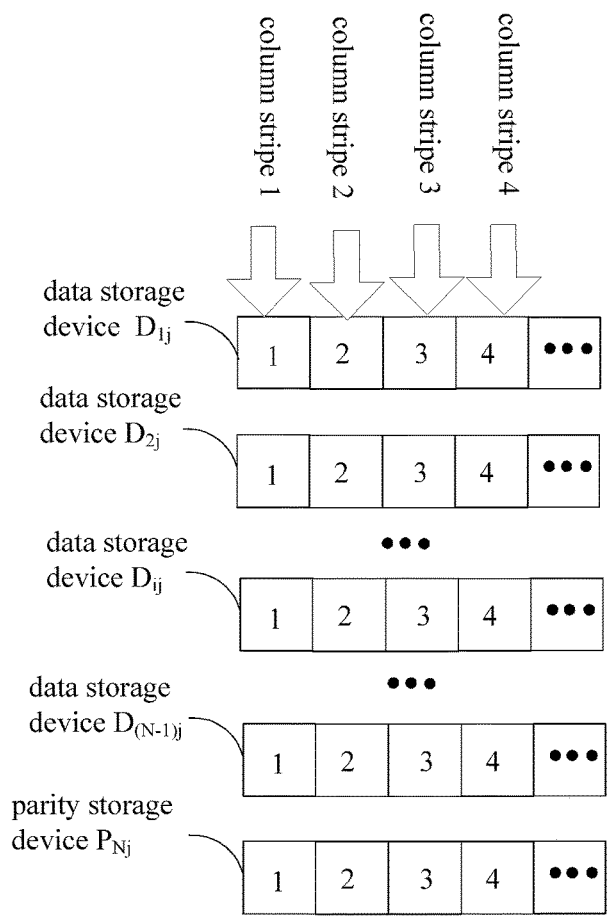
FIG. 4B is a schematic diagram of an embodiment for column stripes of a data device $D_{ij}$ within a 2D matrix.

As illustrated in FIG. 4a and FIG. 4b, devices $D_{i1}$, $D_{i2}$, ... $P_{iM}$ are "Row i storage devices" as shown by FIG. 4a, devices $D_{1j}$, $P_{2j}$, ... $P_{Nj}$ are "Column j storage devices" as shown by FIG. 4b, and memory block striping are configured on a 2D matrix. For any data storage device $D_{ij}$, the storage memory is divided into a number of blocks. In a 2D matrix, memory blocks on storage devices are striped based on each row and column of devices. For any devices in row i within a storage device matrix, stripe-k is the block k on each storage device belongs to the same row. For any devices in column j within a storage device matrix, stripe-k is the block k on each storage device belongs to the same column. As a result, each block in a storage device belongs to two stripes: a row-stripe and a column-stripe. For example, blocks k of devices $D_{i1}, D_{i2}, \ldots, D_{ij}, \ldots, D_{i(m-1)}$ and $P_{iM}$ belong to row-stripe k of device row i, blocks k of devices $D_{1j}, D_{2j}, \ldots, D_{ij}, \ldots, D_{(N-1)j}$ and $P_{Nj}$ belong to column-stripe k of device column j. Thus, block k of device $D_{ij}$ belongs to the stripe k for both device row i and device column j. For example, the memory blocks on storage device $D_{ij}$ are depicted as sequential memory blocks 1, 2, 3, 4 . . . , the protection blocks are depicted as memory blocks 1, 2, 3, 4 . . . of parity storage device $P_{iM}$ and blocks 1, 2, 3, 4 . . . of parity storage device $P_{Nj}$, for purposes of clarity of explanation. When data block k in device $D_{ij}$ is updated, the protection block for the corresponding row-stripe and column-stripe (for example, the block k on parity storage device $P_{iM}$ and $P_{Nj}$), need to be updated.

A protection block may be generated based on parity checksum, known as a parity block. A parity block is a group of parity bits generated based on all of data blocks within its corresponding row stripe or column stripe. Parity blocks may be generated based on an exclusive or (XOR) function or an exclusive nor (XNOR) function.

Controller 101 writes data blocks sequentially to a single selected data storage device 110 until the current data storage device 110 is full before moving to a next data storage device 110. For example, controller 101 may write data blocks sequentially to a single selected data storage device, such as memory blocks 1, 2, 3, 4 . . . of storage device $D_{ij}$, until the storage device $D_{ij}$ is full. Then the data blocks may continue to be stored sequentially to memory blocks 1, 2, 3, 4 . . . of storage device $D_{(i+1)j}$ or any other storage device until it is full, etc.

In an example, when updating a data block, the protection blocks in its corresponding row-stripe and column-stripe need to be updated. Each protection block in a row parity storage device is generated based on data blocks within its corresponding row-stripe. Each protection block in a column parity storage device is generated based on data blocks within its corresponding column-stripe. As showed in FIG. 4a, when data is written to block k of device $D_{ij}$, protection block k of device $P_{iM}$ in its row-stripe is generated based on blocks k of devices $D_{i1}, D_{i2}, \ldots, D_{ij}, \ldots,$ and $D_{i(M-1)}$. As showed in FIG. 4b, when data is written to block k of device $D_{ij}$, protection block k of $P_{Nj}$ in its column-stripe is generated based on blocks k of devices $D_{1j}, D_{2j}, \ldots, D_{ij}, \ldots,$ and $D_{(N-1)j}$. A parity checksum based data protection technology is applied to generate a protection block. In another example, the protection blocks in parity storage devices may be updated after a plurality of storage blocks are written to data storage devices.

The protection blocks on each parity storage device are generated according to data blocks within each stripe, but data blocks in each stripe are not sequentially related and may not be part of the same data flow, read/write access, etc. For example, data blocks k of devices $D_{i1}, D_{i2}, \ldots, D_{ij}, \ldots,$ and $D_{i(M-1)}$ are stored as part of the row-stripe k in row protection array i of the storage device matrix, but may not be sequential from the same data stream and may not be related. Similarly, data blocks k of devices $D_{1j}, D_{2j}, \ldots, D_{ij}, D_{(N-1)j}$ are stored as part of the column-stripe k in column protection array j of the storage device matrix, but may not be sequential from the same data stream and may not be related. Storing data blocks in sequential memory blocks in a single data storage device and by confining all of the protection blocks to the parity storage devices, would minimize the number devices to be activated during read and/or write access, and reduce the power consumptions for a cold storage system. Further, in an embodiment, only one data storage device and its corresponding parity storage devices are accessed per write command when a parity checksum based technology is configured to generate the protection blocks. As a result, when one or more storage devices in a redundant storage array fail, each data block is protected by corresponding protection blocks in its row-stripe and column-stripe. The failure recovery for a data block can be protected not only based on its row-stripe, but also based on its column-stripe. Failure coverage ratio can be largely increased on a configured multi-dimension protection matrix. As such, the redundant storage array based cold storage scheme of system 100 protects against simultaneous storage device failure, reduces power consumption and component wear, supports flexible storage protection expansion, and maintains a reasonable access time.

Figure 5:
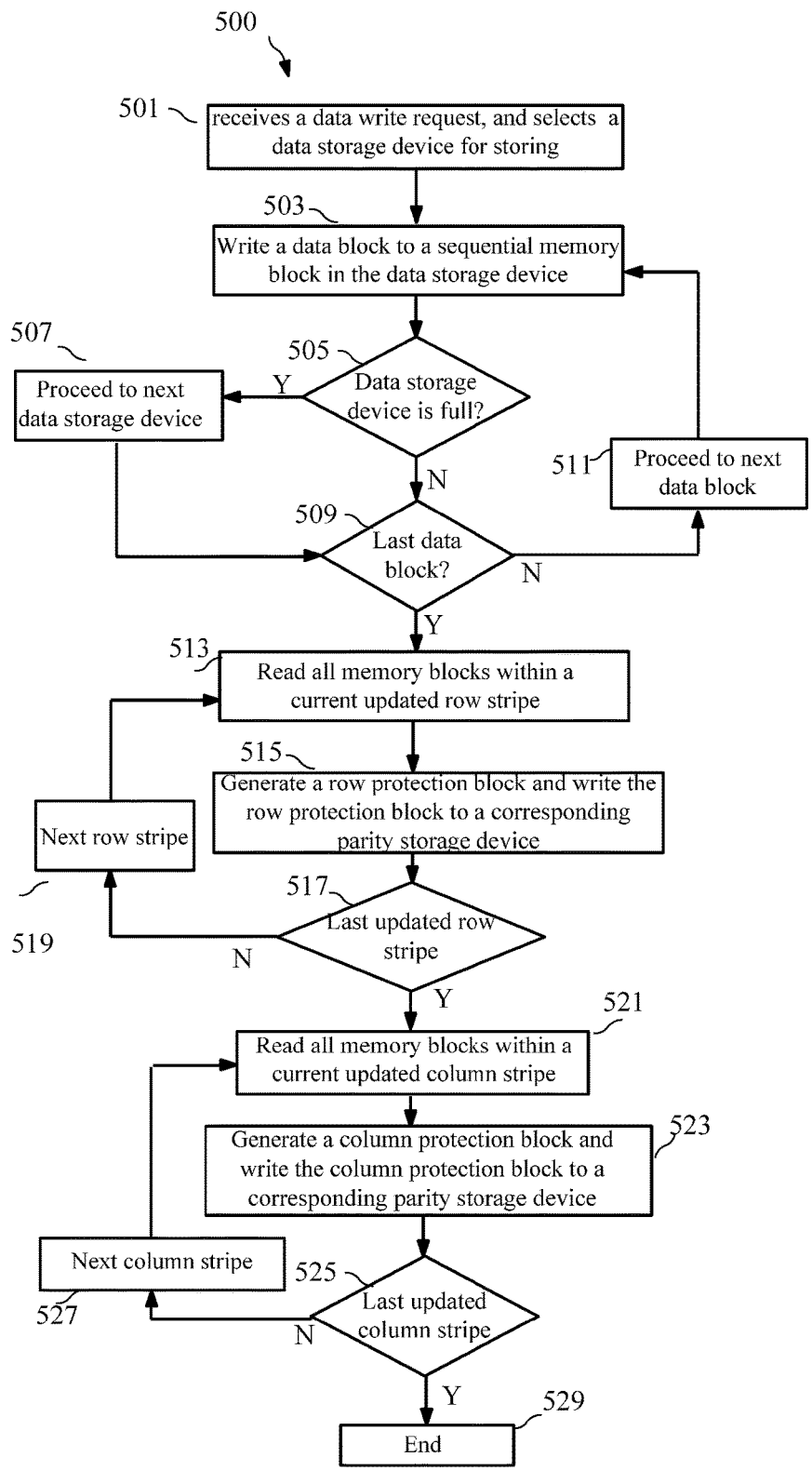
FIG. 5 is a flowchart of an embodiment of a method of data writing in a cold storage system.

FIG. 5 is a flow chart illustrating a data writing process in a 2D matrix of a cold storage system, which includes N×M−1 storage devices. Each 2D matrix has multiple rows and multiple columns. Each row and each column have a plurality of data storage devices and at least one parity storage device. When writing a data block to a data storage device located at (i, j), the corresponding protection blocks in the parity storage devices located at (i, M) and (N, j) need to be updated. Method 500 may be implemented by a controller 101, and/or NE 200. Method 500 is initiated when a controller receives a data flow to be written to the cold storage system. At step 501, the controller receives the data write request to write a plurality of data blocks to the system. Data from the data flow is prepared to be written as a set of data blocks. For example, the data is grouped into blocks with a predefined length, indexed for later searchability, etc. A data storage device is also selected (for example, data storage device $D_{ij}$) to provide a storage location for the data blocks. How to select (or locate) the data storage device is determined by a file system. Steps 503, 505, 507, 509, and 511 iteratively write data blocks to sequential memory blocks in the selected data storage device $D_{ij}$ until the data blocks prepared in step 501 is completely stored. At step 503, a data block is written to a sequential memory block in the current data storage device $D_{ij}$. The data block belongs to a row stripe distributed over one row of the matrix and to a column stripe distributed over one column of the matrix. After the current data block is written, method 500 proceeds to step 505 to determine if the data storage device is full after writing the current data block at step 503. If the data storage device $D_{ij}$ is full, method 500 proceeds to step 507 and proceeds to a next data storage device (for example, data storage device $D_{(i+1)j}$ or data storage device $D_{i(j+1)}$) before proceeding to step 509. If the data storage device is not full, method 500 proceeds to step 509. At step 509, the method determines whether the current data block written at step 503 is the last data block to be written. If more data blocks are to be written, the method proceeds to step 511 and proceeds to the next data block to be written before returning to step 503 to continue writing data blocks to sequential memory blocks on the current data storage device $D_{ij}$. Accordingly, by employing steps 503, 505, 507, 509, and 511, the sequential data blocks are written to a plurality of sequential memory blocks on a common data storage device $D_{ij}$, such that the data blocks written to memory blocks are independent from the stripes across over all storage devices in the same redundant storage array. For a serial of data blocks, no data blocks are written to an alternate data storage device until the current data storage device $D_{ij}$ is full. In other words, memory blocks are written on a device by device basis and not on a stripe by stripe basis.

If the current data block is the last block to be written at step 509, method 500 proceeds to step 513. Steps 513, 515, 517, and 519 are employed to generate protection blocks and write the generated blocks to the parity storage devices for all stripes updated during steps 503, 505, 507, 509, and 511. Such as, the controller generates a row protection block for the row stripe and a column protection block for the column stripe, writes the row protection block to the at least one parity storage device in the row containing the row stripe, and writes the column protection block to the at least one parity storage device in the column containing the column stripe. At step 513, all memory blocks within a current updated stripe are read across all data storage devices. An updated stripe is a stripe, either a row stripe or a column stripe, where at least one data blocks is updated during the writing process. Take the updated stripe is a row stripe as an example. At step 515, a row protection block is generated for the current row stripe. Such row protection block is written to a corresponding parity storage device in the row. At step 517, method 500 determines whether the current row stripe is the last updated row stripe. If the current stripe is not the last updated row stripe, method 500 proceeds to step 519 and continues to the next updated row stripe before returning to step 513. If the current row stripe is the last updated row stripe, method 500 proceeds to step 521. At step 521, all memory blocks within a current updated column stripe are read across all data storage devices. At step 523, a column protection block is generated for the current column stripe. Such column protection block is written to the corresponding parity storage device in the column. At step 525, method 500 determines whether the current column stripe is the last updated column stripe. If the current stripe is not the last updated column stripe, method 500 proceeds to step 527 and continues to the next updated column stripe before returning to step 521. If the current column stripe is the last updated column stripe, method 500 proceeds to step 529 and ends.

For example, the data storage device located at (i, j) is selected for storage. Data blocks are stored sequentially to memory blocks 1, 2, 3, and 4 in the data storage device $D_{ij}$. All of memory block 1 on devices $D_{i1}, D_{i2}, \ldots, D_{ij}, \ldots,$ and $D_{i(M-1)}$ within the row stripe 1 of the row protection array i are read to generate row protection block 1 of parity storage device $P_{iM}$. Then, the controller writes the generated row protection block 1 to the parity storage device $P_{iM}$. All of memory block 2 on devices $D_{i1}, D_{i2}, \ldots, D_{ij}, \ldots,$ and $D_{i(M-1)}$ within the row-stripe 2 of the row protection array i are read to generate row protection block 2 of parity storage device $P_{iM}$. Then, the controller writes the generated row protection block 2 to the parity storage device $P_{iM}$, till row protection block 4 of parity storage device $P_{iM}$ is updated at the end of row stripe 4 of the row protection array i. After protection blocks for row stripes are generated, all of memory block 1 on devices $D_{1j}, D_{2j}, \ldots, D_{ij},$ and $D_{(N-1)j}$ within column stripe 1 of column protection array j are read to generate column protection block 1 of parity storage device $P_{Nj}$. Then the controller writes the generated column protection block 1 to the parity storage device $P_{Nj}$. All of memory block 2 on devices $D_{1j}, \ldots, D_{2j}, \ldots, D_{ij}, \ldots,$ and $D_{(N-1)j}$ within the column stripe 2 of column protection array j are read to generate column protection block 2 of parity storage device $P_{Nj}$. Then, the controller write the generated column protection block 2 to the parity storage device $P_{Nj}$, till block 4 of device $P_{Mj}$ is updated at the end of column stripe 4 of column protection array j.

FIG. 5 is an example to generate and write row protection blocks first, and then generate and write column protection blocks after. There are other approaches to generate the protection blocks. For example, protection blocks are generated for column stripes first, and then generated for row stripes after, respectively.

Method 500 requires only that one currently selected data storage device $D_{ij}$ is activated during the data storage phase of steps 503, 505, 507, 509, and 511. Once a current data storage device $D_{ij}$ is filled, the current data storage device $D_{ij}$ can be deactivated and the next data storage device $D_{(i+1)j}$ or data storage device $D_{i(j+1)}$ is activated. Further, only the currently selected data storage device $D_{ij}$ must be activated during a corresponding read method as discussed below. In step 513, 515, 517, and 519, all of data storage devices and parity storage device(s) corresponding to the current row stripe are activated. Similarly, in step 521, 523, 525, and 527, all of data storage devices and parity storage device(s) corresponding to the current column stripe are activated. Method 500 is a generic data protection solution, which can be applied with almost all data protection technologies, such as parity checksum, Reed Solomon codes, etc.

Figure 6:
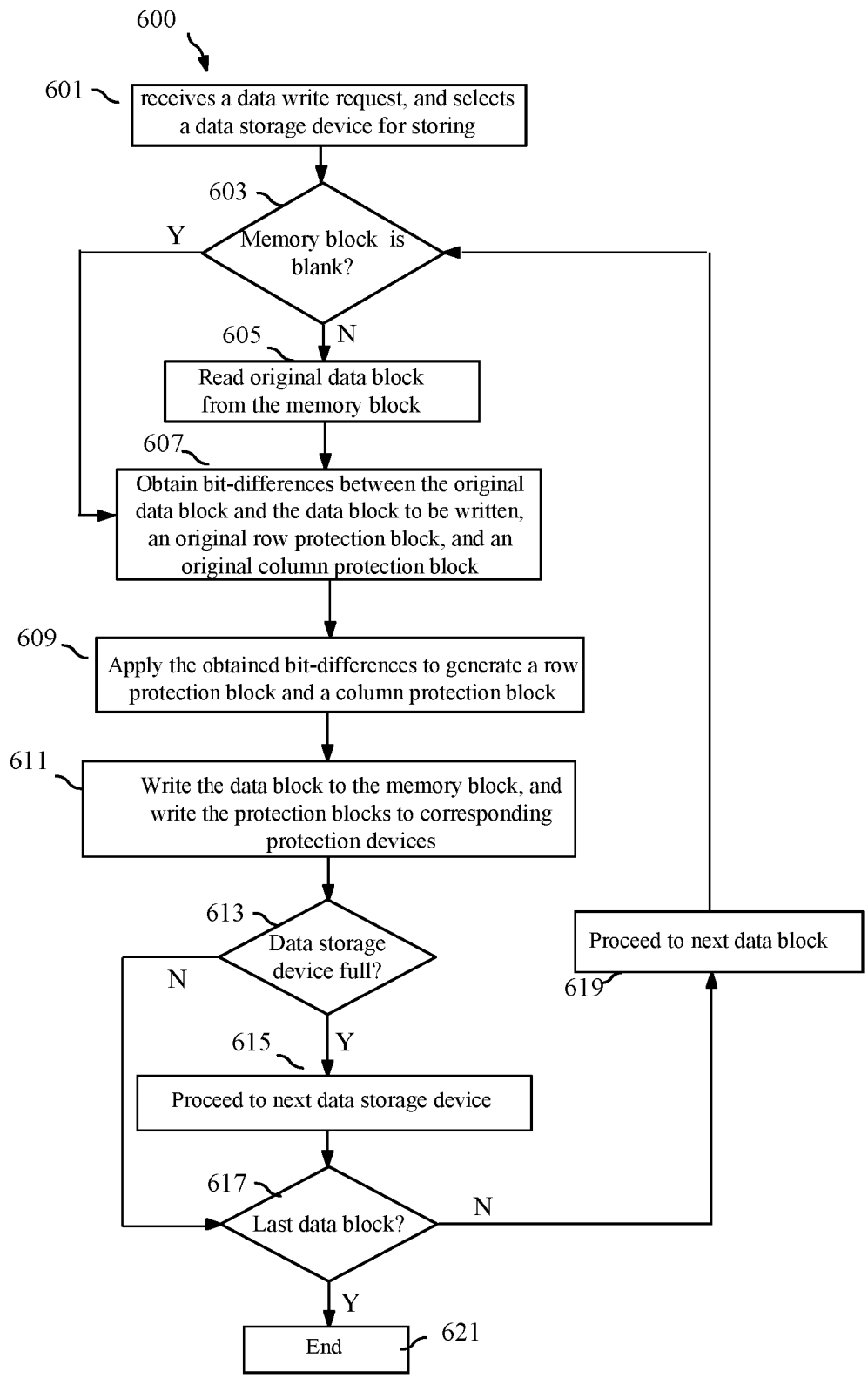
FIG. 6 is a flowchart of another embodiment of a method of data writing in a cold storage system.

FIG. 6 is another flow chart illustrating data writing in a cold storage system.

Comparing to method 500, method 600, applied to the parity checksum based protection technology only, requires less storage devices (e.g. data storage devices 110) activated during a data writing process. For example, when writing a data block to a data storage device $D_{ij}$ in a 2D matrix, method 600 requires only one data storage device, $D_{ij}$, and two parity storage devices, $P_{Nj}$, and $P_{iM}$, to be activated. Method 600 may be implemented by a controller 101, and/or NE 200. Method 600 is initiated when a controller receives a data flow to be written to the cold storage system. Step 601 is substantially similar to step 501. At step 603, method 600 determines whether a memory block allocated for writing a current data block is blank. If the memory block is not blank, method 600 proceeds to step 605 to read original data block from the memory block before the current data block is written to the memory block and proceeds to step 607. If the memory block is blank, method 600 proceeds directly to step 607. At step 607, the controller obtains bit-differences between the original data block and the current data block to be written. The controller obtain an original row protection block from the corresponding row stripe and an original column protection block from the corresponding column stripe on the parity storage devices before moving to step 609. At step 609, the controller generates a row protection block and a column protection block for the data block to be written by applying the bit-differences to the original protection blocks respectively. Specifically, the existing value of a protection block is impacted by the bit-differences between the current values of the protection block and the original values of the protection block on the data storage device 110. For example, a change in a bit in a data block would require a corresponding bit to be changed in the corresponding protection blocks. As such, other data storage devices may remain inactive during data writing process. At step 611, the data block prepared at step 601 is written over the values at the current memory block on the selected data storage device. The corresponding protection blocks generated at step 609 are written to the protection blocks in the corresponding row stripe and column stripe on the parity storage devices, respectively. At step 613, the method determines whether the current data storage device is full. If the data storage device is not full, method 600 proceeds to step 617. Otherwise, method 600 proceeds to the next data storage device at step 615 before continuing to step 617. At step 617, method 600 determines whether the current data block is the last data block to be written from the data flow. If no more data block needs to be written, method 600 proceeds to step 621 and ends. Otherwise, method 600 proceeds to step 619 and move to the next data block to be written from the data flow before returning to step 603. Like method 500, the sequential data blocks are written sequentially to the currently selected data storage device so that data blocks are written on a device by device basis and not on a stripe by stripe basis. Moreover, more data storage devices with previously stored data can be added into the matrix by simply updating the protection blocks on all of impacted parity storage devices without touching the data blocks on the original data storage devices.

Figure 7:
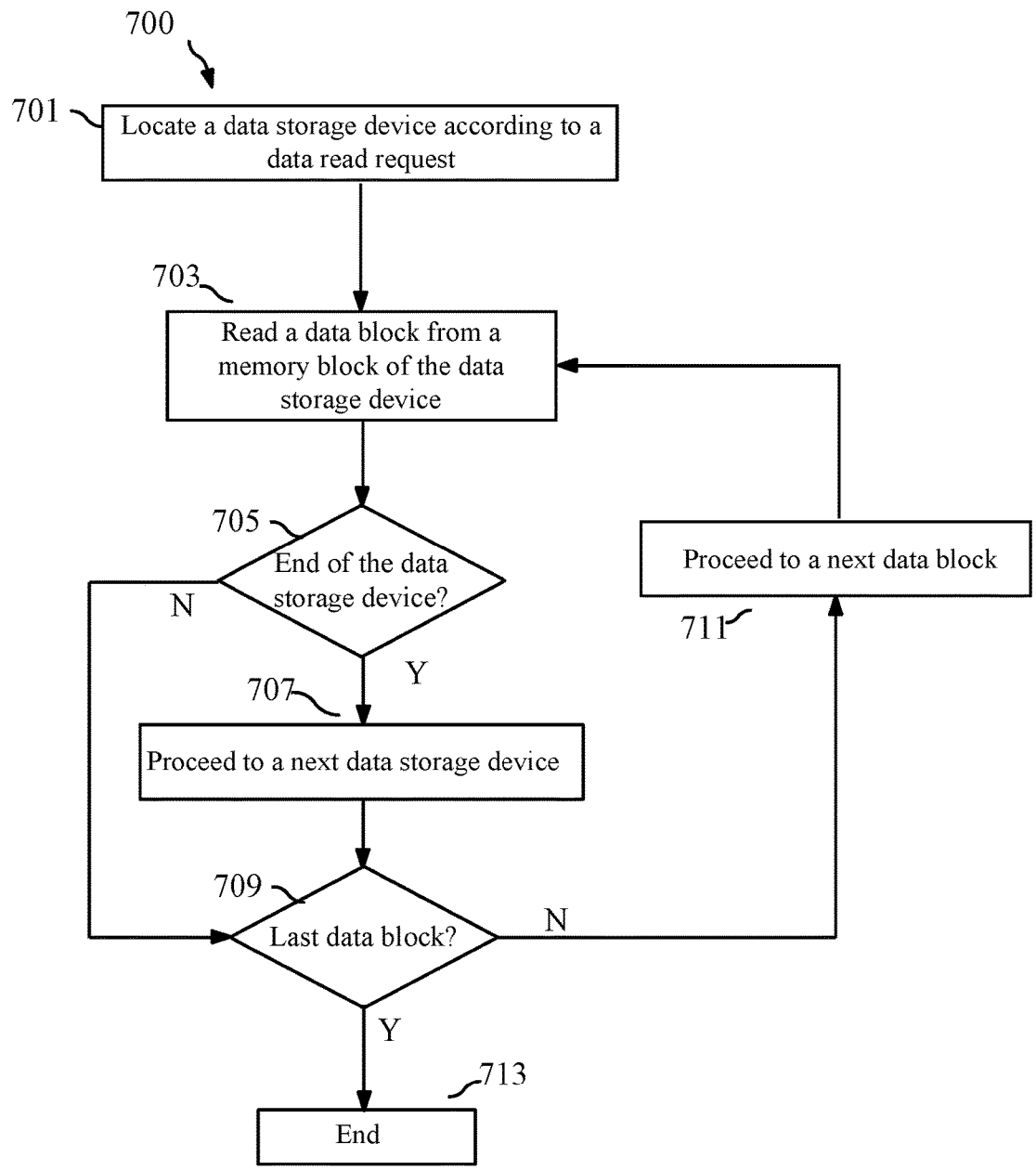
FIG. 7 is a flowchart of an embodiment of a method of data reading from a cold storage system.

FIG. 7 is a flowchart of an embodiment of a method 700 of data reading in a cold storage system, such as system 100. Method 700 may be implemented by a controller 101, and/or NE 200. Method 700 is initiated when a controller receives a data read request, and determines to read data blocks from one or more data storage devices in a redundant storage array. At step 701, a data storage device is located according to the data read request, for example based on an index search, or a node table. At step 703, a data block is read from a memory block of the located data storage device before proceeding to step 705. If the end of the data storage device has been reached at step 705, method 700 proceeds to step 707 and moves to a next data storage device before continuing to step 709. If the end of the data storage device has not been reached at step 705, the method proceeds directly to step 709. At step 709, method 700 determines whether the last desired data block of the data read request has been read. If the current data block is the last data block to be read, method 700 proceeds to step 713 and ends. If the current data block is not the last data block to be read, method 700 proceeds to step 711, selects a next data block, and returns to step 703. By employing method 700, a redundant storage array based system written according to methods 500 or 600 can be read by activating a single data storage device without activating all other storage devices, which may result in significant savings in power consumption and component wear.

Figure 8:
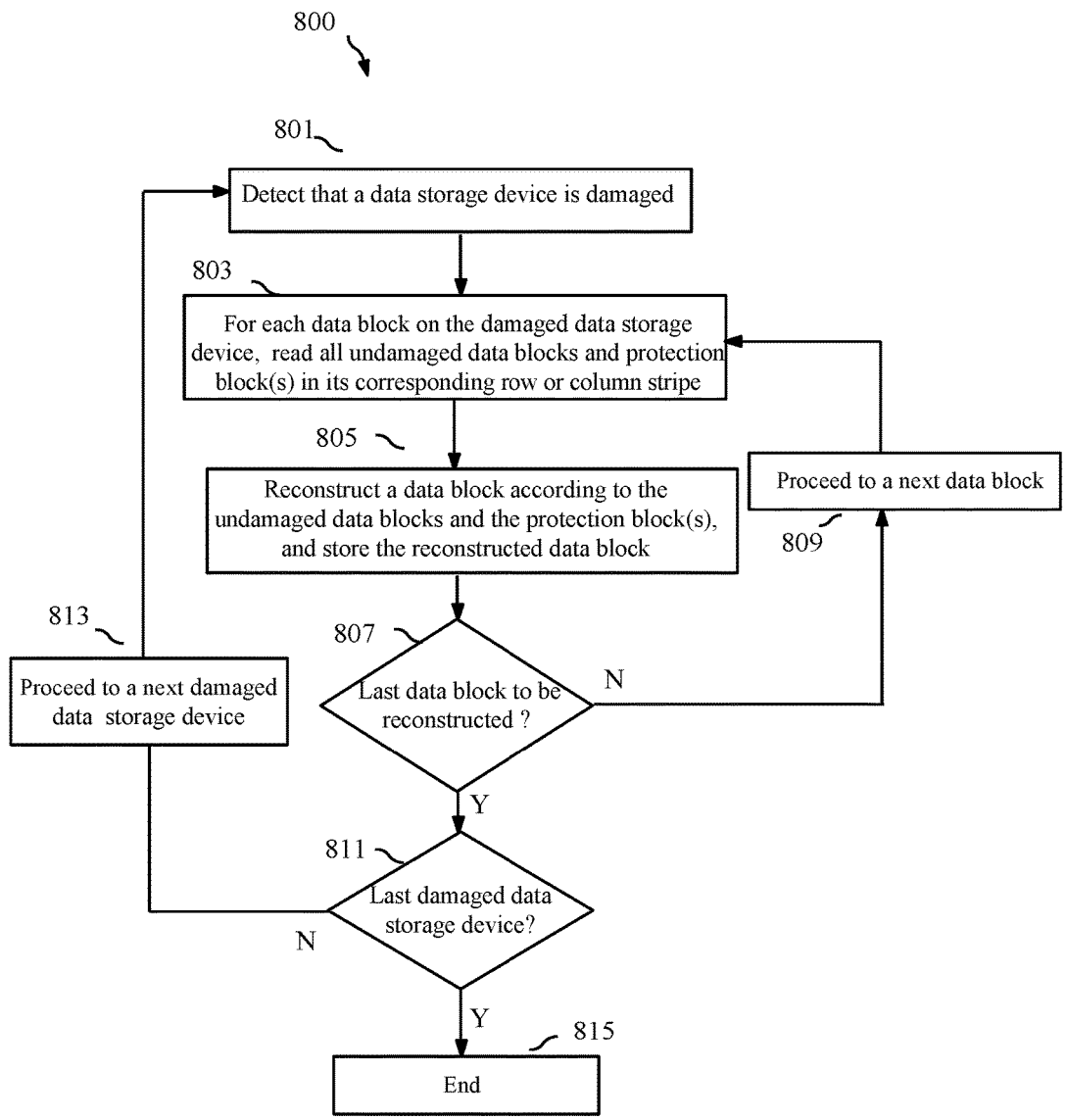
FIG. 8 is a flowchart of an embodiment of a method of data recovery in a cold storage system.

FIG. 8 is a flowchart of an embodiment of a method 800 of data recovery in a cold storage system, such as system 100. Method 800 may be implemented by a controller 101, and/or NE 200. Method 800 is initiated when one or more storage devices in a redundant storage array failed. For example, one or more failed storage devices may be replaced (e.g. by a technician) by a number of empty storage devices. At step 801, the controller detects that a data storage device is damaged. At step 803, for each data block on the damaged data storage device, the controller reads all undamaged data blocks and protection block(s) in its corresponding row or column stripe. If there are two or more data storage devices are damaged in its row stripe, the controller can read all undamaged data blocks and protections blocks from its column stripe. If there are two or more data storage devices are damaged in its column stripe, the controller can read all undamaged data blocks and protections blocks from its row stripe. If two or more storage devices are damaged in its row stripe and column stripe, the controller may skip this data storage device temporarily and proceed to a next damaged data storage device. At step 805, the controller reconstructs a data block according to the undamaged data blocks and the protection block(s), and stores the reconstructed data block to a memory block of a replacement data storage device. The reconstructed data block belongs to the row stripe or the column stripe. The controller determines if the current data block is the last data block to be reconstructed on the damaged data storage device at step 807. If the current data block is the last data block to be reconstructed on the damaged data storage device, method 800 proceeds to step 811. If the current data block is not the last data block to be reconstructed on the damaged data storage device, method 800 proceeds to step 809, moves to next data block, and returns to step 803. At step 811, the controller determines if the current device is the last damaged data storage device in the storage device matrix. If the current device is the last damaged data storage device in the storage device matrix, method 800 proceeds to step 815 and end. If the current device is not the last damaged data storage device, method 800 proceeds to step 813, moves to next damaged data storage device, and returns to step 801. As shown by method 800, the damaged storage devices in a redundant storage array such as system 100 can be reconstructed in case of storage device failure without loss of data. For a certain number of device failures simultaneously on a data protected storage system, the protection ratio is the total number of recoverable failure cases versus the total number of possible failure cases. By configuring storage devices into a matrix, a data block of a data storage device can be reconstructed (or recovered) not only by its row stripe, but also by its column stripe. Therefore, protection ratio (PR) can be increased largely. PR can also be called failure coverage ratio and indicates the percentage of recoverable failures for a certain number of devices failed simultaneously.

The maximum number of recoverable storage devices depends on the data protection technology employed on the cold storage system. Take an N×N matrix as an example. The N×N matrix includes N×N−1 storage devices.

Figure 9:
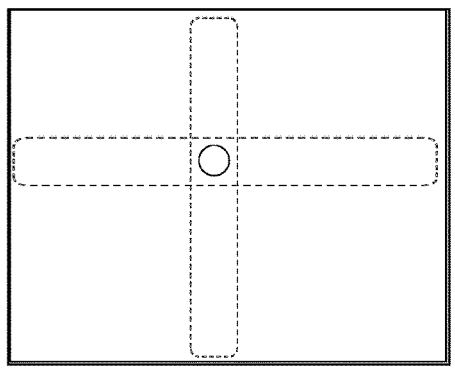
FIG. 9 is a schematic diagram of an embodiment of a possible single failed device in a 2D matrix.

As shown in FIG. 9, if any single failed device in the N×N matrix, the failed device can be recovered by either its row or column protection array. The PR is 100% in this situation.

Figure 10A:
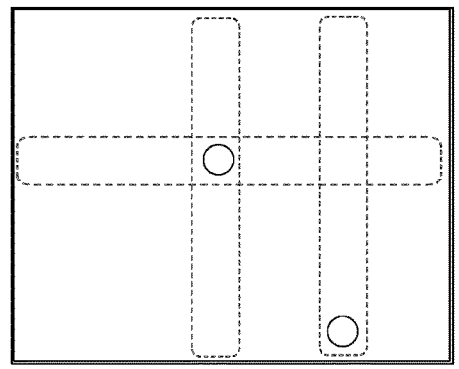
FIG. 10A is a schematic diagram of an embodiment of a possible two failed devices in a 2D matrix.
Figure 10B:
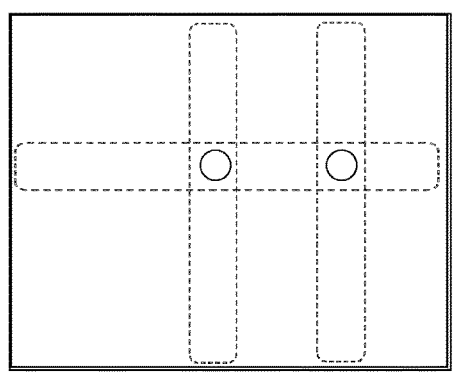
FIG. 10B is a schematic diagram of an embodiment of a possible two failed devices in a 2D matrix.
Figure 10C:
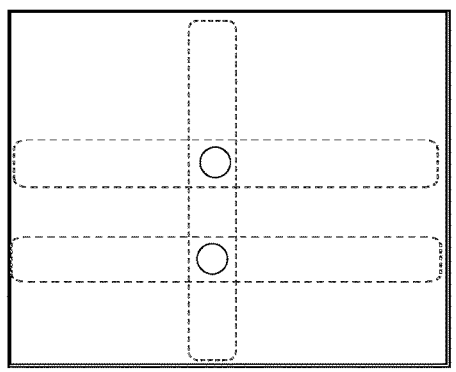
FIG. 10C is a schematic diagram of an embodiment of a possible two failed devices in a 2D matrix.
Figure 11A:
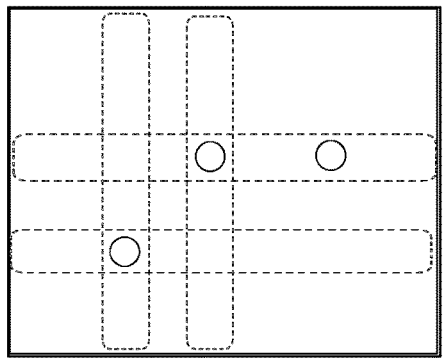
FIG. 11A is a schematic diagram of an embodiment of a possible three failed devices in a 2D matrix.
Figure 11B:
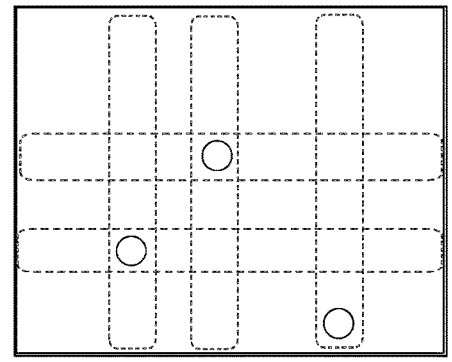
FIG. 11B is a schematic diagram of an embodiment of a possible three failed devices in a 2D matrix.
Figure 11C:
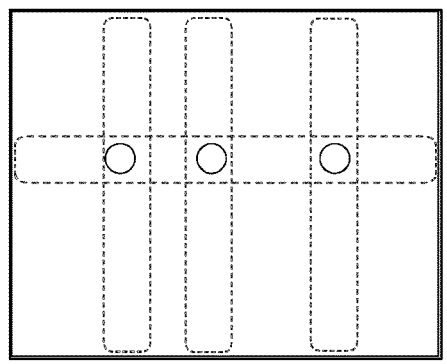
FIG. 11C is a schematic diagram of an embodiment of a possible three failed devices in a 2D matrix.
Figure 11D:
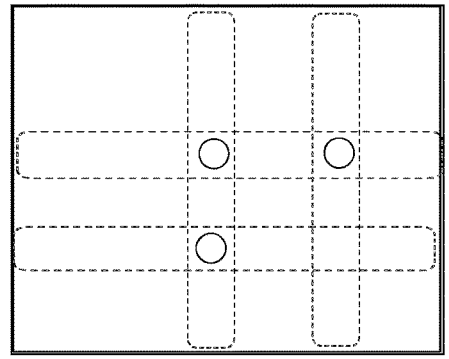
FIG. 11D is a schematic diagram of an embodiment of a possible three failed devices in a 2D matrix.
Figure 11E:
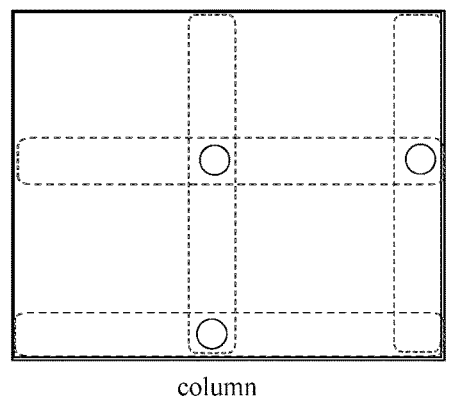
FIG. 11E is a schematic diagram of an embodiment of a possible three failed devices in a 2D matrix.
Figure 12A:
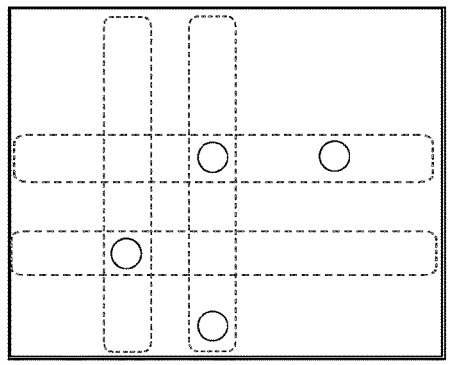
FIG. 12A is a schematic diagram of an embodiment of a possible four failed devices in a 2D matrix.
Figure 12B:
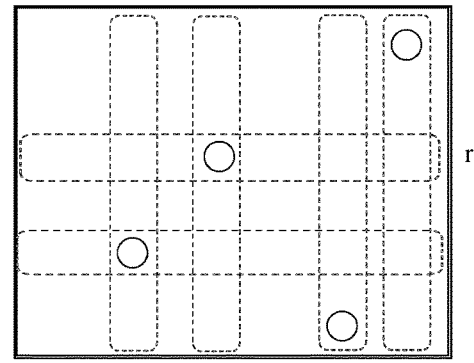
FIG. 12B is a schematic diagram of an embodiment of a possible four failed devices in a 2D matrix.
Figure 12C:
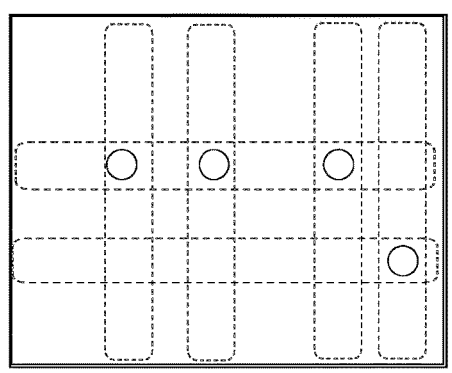
FIG. 12C is a schematic diagram of an embodiment of a possible four failed devices in a 2D matrix.
Figure 12D:
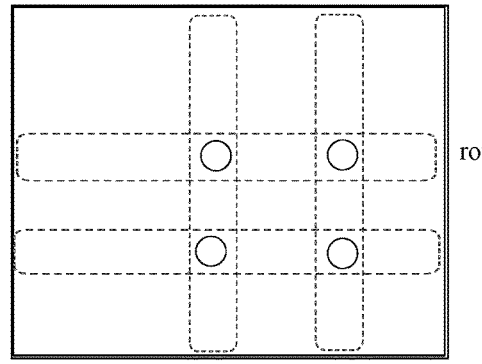
FIG. 12D is a schematic diagram of an embodiment of a possible four failed devices in a 2D matrix.
Figure 12E:
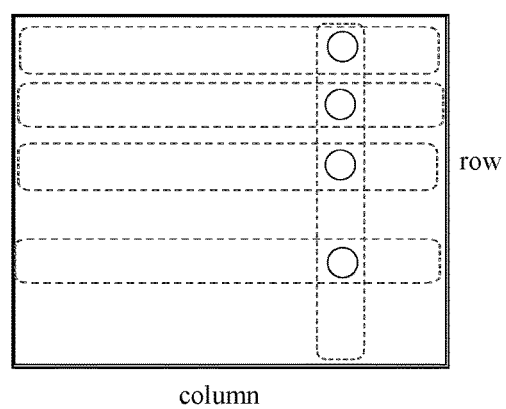
FIG. 12E is a schematic diagram of an embodiment of a possible four failed devices in a 2D matrix.

As shown in FIGS. 10a, 10b and 10c, if any two failed device in the N×N matrix, each failed device is a single failure in its row or column protection array. The failed device can be recovered by either its row or column protection array. The PR is 100% in this situation.

As shown in FIGS. 11a, 11b, 11c, 11d and 11e, 3-device are failed simultaneously in an N×N matrix. Because there is no storage device located at (N, N), the failed 3 storage devices with the non-existing device at (N, N) are formed a rectangle (in FIG. 11e). In this case, none of the failed device can be recovered by either row or column protection array. In 3-device failed case, PR≈98.02% when N=4; PR≈99.21% when N=5; PR≈99.62% when N=6; PR≈99.79% when N=7; PR≈99.88% when N=8; PR≈99.92% when N=9; PR≈99.95% when N=10.

As shown in FIGS. 12a, 12b, 12c, 12d and 12e, 4-device are failed simultaneously in an N×N matrix. If 4 failed storage devices or any 3 of the 4 failed with the non-existing device at (N, N) form a rectangle (in FIG. 12d), the failed storage devices cannot be fully recovered by their row or column protection devices. Considering the unrecoverable cases, PR≈90.77% when N=4; PR≈96.39% when N=5; PR≈98.28% when N=6; PR≈99.07% when N=7; PR≈99.46% when N=8; PR≈99.66% when N=9; PR≈99.78% when N=10.

Where PR>99% (N>6) when any four devices failed in the N×N matrix. Because 5 failures is equivalent to 4 failures after recovering a failure device, protection ratio for 5 failures is the same as 4 failures.

As such, limited redundant parity storage devices are required, but higher protection level can be achieved, 100% recoverable for 1 or 2 devices failed simultaneously, more than 99% recoverable for 3-device failures when N>4, more than 99% recoverable for 4 or 5 device failures when N>6, and more. Moreover, the cold storage scheme protects storage device from failure with reduced power consumption—for a device at (j, k) within an N×N matrix: three devices need to be activated when writing data—the devices located at (j, k), (j, N), and (N, k) as illustrated by the embodiment of method 600; one device needs to be activated when reading data the device located at (j, k) as illustrated by the embodiment of method 700; and one row (row j) or one column (column k) of devices needs to be activated when recovering a damaged device at (j, k) as illustrated by the embodiment of method 800. Correspondingly, the cold storage scheme protects storage devices from failure with more reliable and higher protection ratio at lower costs, reduces power consumption and component wear, provides flexibility and simplicity for expansion of a cold storage system, and maintains a reasonable access time (e.g. single access read/write) for data access requests under a cold storage system environment.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A data storage method performed by a controller in a cold storage system, wherein the system includes data storage devices configured to store data blocks and parity storage devices configured to store protection blocks, and wherein the data storage devices and the parity storage devices form a 2 dimensional (2D) matrix, the 2D matrix having multiple rows and multiple columns, the method comprising:
   receiving a data write request to write a plurality of data blocks to the system;
   selecting a data storage device for storing the plurality of data blocks;
   writing the data blocks sequentially into memory blocks of the selected data storage device without activating any of other data storage devices, each data block belonging to a row stripe distributed over one row of the matrix and to a column stripe distributed over one column of the matrix;
   generating a row protection block for the row stripe and a column protection block for the column stripe for the said each data block; and
   writing the row protection block to a parity storage device in the row, and the column protection block to a parity storage device in the column.

2. The method of claim 1, wherein the steps of generating the row protection block for the row stripe and the column protection block for the column stripe comprising:
   obtaining bit-differences between an original data block and the said each data block, wherein the original data block is read from a memory block before the said each data block is written to the memory block;
   obtaining an original row protection block from the parity storage device in the row, and obtaining an original column protection block from the parity storage device in the column; and
   generating the row protection block for the row stripe and the column protection block for the column stripe by applying the bit-differences to the original row protection block and the original column protection block.

3. The method of claim 1, wherein the steps of generating the row protection block for the row stripe and the column protection block for the column stripe comprising:
   reading all data blocks within the row stripe, and all data blocks within the column stripe;
   generating the row protection block for the said each data block according to all data blocks within the row stripe; and
   generating the column protection block for the said each data block according to all data blocks within the column stripe.

4. The method of claim 1, the method further comprising:
   detecting the data storage device is damaged;
   reading all undamaged data blocks and the row protection block of the row stripe;
   reconstructing the said each data block according to the undamaged data blocks and the row protection block; and
   storing the reconstructed data block to a memory block of a replacement data storage device, wherein the reconstructed data block belongs to the row stripe.

5. The method of claim 1, the method further comprising:
   detecting the data storage device is damaged;
   reading all undamaged data blocks and the column protection block of the column stripe;
   reconstructing the said each data block according to the undamaged data blocks and the column protection block; and
   storing the reconstructed data block to a memory block of a replacement data storage device, wherein the reconstructed data block belongs to the column stripe.

6. A controller applied in a cold storage system, wherein the system includes data storage devices configured to store data blocks and parity storage devices configured to store protection blocks, and wherein the data storage devices and the parity storage devices form a 2 dimensional (2D) matrix, the 2D matrix having multiple rows and multiple columns, the controller comprising:
   a processor; and
   a memory coupled to the processor and storing programming for execution by the processor;
   the processor is configured to execute the programming to perform operations of:

receiving a data write request to write a plurality of data blocks to the system;

selecting a data storage device for storing the plurality of data blocks;

writing the data blocks sequentially into memory blocks of the selected data storage device without activating any of other data storage devices, each data block belonging to a row stripe distributed over one row of the matrix and to a column stripe distributed over one column of the matrix;

generating a row protection block for the row stripe and a column protection block for the column stripe for the said each data block; and writing the row protection block to a parity storage device in the row, and the column protection block to a parity storage device in the column.

7. The controller of claim 6, wherein the processor is configured to execute the programming to perform the generating comprising:

obtaining bit-differences between an original data block and the said each data block, wherein the original data block is read from a memory block before the said each data block is written to the memory block;

obtaining an original row protection block from the parity storage device in the row, and obtaining an original column protection block from the parity storage device in the column; and generating the row protection block for the row stripe and the column protection block for the column stripe by applying the bit-differences to the original row protection block and the original column protection block.

8. The controller of claim 6, wherein the processor is configured to execute the programming to perform the generating comprising:

reading all data blocks within the row stripe, and all data blocks within the column stripe;

generating the row protection block for the said each data block according to all data blocks within the row stripe; and generating the column protection block for the said each data block according to all data blocks within the column stripe.

9. The controller of claim 6, wherein the processor is further configured to execute the programming to perform operations of:

detecting the data storage device is damaged;

reading all undamaged data blocks and the row protection block of the row stripe;

reconstructing the said each data block according to the undamaged data blocks and the row protection block; and storing the reconstructed data block to a memory block of a replacement data storage device, wherein the reconstructed data block belongs to the row stripe.

10. The controller of claim 6, wherein the processor is further configured to execute the programming to perform operations of:

detecting the data storage device is damaged;

reading all undamaged data blocks and the column protection block of the column stripe;

reconstructing the said each data block according to the undamaged data blocks and the column protection block; and storing the reconstructed data block to a memory block of a replacement data storage device, wherein the reconstructed data block belongs to the column stripe.

11. A cold storage system includes a controller, data storage devices configured to store data blocks, and parity storage devices configured to store protection blocks, and wherein the data storage devices and the parity storage devices form a 2 dimensional (2D) matrix, the 2D matrix having multiple rows and multiple columns:

the controller configured to receive a data write request to write a plurality of data blocks to the system;

select a data storage device for storing the plurality of data blocks;

write the data blocks sequentially into memory blocks of the selected data storage device without activating any of other data storage devices, each data block belonging to a row stripe distributed over one row of the matrix and to a column stripe distributed over one column of the matrix;

generate a row protection block for the row stripe and a column protection block for the column stripe for the said each data block; and write the row protection block to a parity storage device in the row, and the column protection block to a parity storage device in the column.

12. The cold storage system of claim 11, wherein the controller is configured to perform the generating step comprises:

obtaining bit-differences between an original data block and the said each data block, wherein the original data block is read from a memory block before the said each data block is written to the memory block;

obtaining an original row protection block from the parity storage device in the row, and obtaining an original column protection block from the parity storage device in the column; and generating the row protection block for the row stripe and the column protection block for the column stripe by applying the bit-differences to the original row protection block and the original column protection block.

13. The cold storage system of claim 11, wherein the controller is configured to perform the generating step comprises:

reading all data blocks within the row stripe, and all data blocks within the column stripe;

generating the row protection block for the said each data block according to all data blocks within the row stripe; and generating the column protection block for the said each data block according to all data blocks within the column stripe.

14. The cold storage system of claim 11, wherein the controller is further configured to:

detect the data storage device is damaged;

read all undamaged data blocks and the row protection block of the row stripe;

reconstruct the said each data block according to the undamaged data blocks and the row protection block; and store the reconstructed data block to a memory block of a replacement data storage device, wherein the reconstructed data block belongs to the row stripe.

15. The cold storage system of claim 11, wherein the controller is further configured to:

detect the data storage device is damaged;

read all undamaged data blocks and the column protection block of the column stripe;

reconstruct the said each data block according to the undamaged data blocks and the column protection block; and store the reconstructed data block to a memory block of a replacement data storage device, wherein the reconstructed data block belongs to the column stripe.

* * * * *